(12) United States Patent
Luh

(10) Patent No.: US 6,450,052 B1
(45) Date of Patent: Sep. 17, 2002

(54) GEARBOX STRUCTURE OF A BEACH CYCLE

(75) Inventor: Tai-Yang Luh, Tai Pei (TW)

(73) Assignee: Jenn Jianq Co., Ltd., Taichung Hsien (TW)

( * ) Notice: Subject to any disclaimer, the term of this patent is extended or adjusted under 35 U.S.C. 154(b) by 27 days.

(21) Appl. No.: 09/828,415

(22) Filed: Apr. 6, 2001

(51) Int. Cl.[7] .................... F16H 59/00; F16H 61/00; F16H 63/00
(52) U.S. Cl. .................................. 74/337.5; 74/336 B
(58) Field of Search ......................... 74/337.5, 336 B, 74/339; 180/211, 217

(56) References Cited

U.S. PATENT DOCUMENTS 4,754,662 A * 7/1988 Misawa ..................... 74/337.5
4,781,022 A * 11/1988 Hayashi et al. ............... 60/489
5,542,309 A * 8/1996 Wenger et al. ............. 74/337.5

* cited by examiner

Primary Examiner—Sherry Estremsky
Assistant Examiner—Tisha D. Lewis
(74) Attorney, Agent, or Firm—Alan Kamrath; Rider, Bennett, EGan & Arundel, LLP

(57) ABSTRACT

A gearbox structure of a beach cycle includes a gearbox which may transmit a power of an engine to a power shaft and a propeller shaft. A clutch mounted between the change gears of the gearbox can be shifted by a gear shift device into a neutral position, a reverse gear position and a forward gear position. The gear shift device includes a gear lever which rotates a sector shaped gear which rotates a gear shift cam shaft which is formed with a slot for driving a gear shift drive fork which shifts the clutch to the neutral position, the reverse gear position, and the forward gear position. The gearbox is further provided with a force increase gear, and the propeller shaft is additionally provided with a drive gear which meshes with a helical gear of a distance calculator which has a connecting line externally connected to an odometer.

2 Claims, 6 Drawing Sheets

GEARBOX STRUCTURE OF A BEACH CYCLE

BACKGROUND OF THE INVENTION

1. Field of the Invention

The present invention relates to a gearbox structure of a beach cycle, and more particularly to a gearbox structure of a beach cycle, wherein the gearbox is further provided with a force increase gear, and the propeller shaft is additionally provided with a drive gear which meshes with a helical gear of a distance calculator which has a connecting line externally connected to an odometer.

2. Description of the Related Prior Art

A conventional beach cycle in accordance with the prior art uses a CVT gear shift to transmit the power of the engine into the gearbox. The conventional beach cycle usually includes a forward gear only, without a force increase gear, so that when the beach cycle is trapped in a muddy situation, it cannot move forward easily. In addition, the distance calculator used for the odometer is mounted outside of the gearbox of the conventional beach cycle, so that the distance calculator is easily worn out.

SUMMARY OF THE INVENTION

The primary objective of the present invention is to provide a gearbox structure of a beach cycle, wherein the gearbox is further provided with a force increase gear, and the propeller shaft is additionally provided with a drive gear which meshes with a helical gear of a distance calculator which has a connecting line externally connected to an odometer.

In accordance with the present invention, there is provided a gearbox structure of a beach cycle comprising:

a gearbox for transmitting a power of an engine through a CVT gear shift to a power shaft which is fitted with a propeller shaft, the power shaft and the propeller shaft directly meshing with each other through a reduction gear and change gears mounted on a gear shift shaft, and through steering gears mounted on a steering shaft, the change gears including a backward used change gear, and a forward used change gear, the propeller shaft provided with a forward used drive gear meshing with the forward used change gear, the gear shift shaft having an outer periphery formed with outer splines, a first clutch slidably mounted on the outer splines of the gear shift shaft, the first clutch formed with locking blocks engaged with locking blocks formed on the change gears, so that the first clutch can be shifted by a gear shift device into a neutral position, a reverse gear position and a forward gear position, the gear shift device including a gear lever which rotates a sector-shaped gear which meshes and rotates a gear shift cam shaft which is formed with a first slot having a track variation for driving a first gear shift drive fork which drives and shifts the first clutch to the neutral position, the reverse gear position, and the forward gear position, the gearbox provided with a positioning spring, and a positioning ball, the gear shift cam shaft formed with positioning recesses each mating with a respective gear position and each co-operating with the positioning spring, and the positioning ball, so that the gear shift cam shaft can be rotated to a correct gear position;

wherein, the gear shift shaft is provided with a force increase used change gear, the propeller shaft is provided with a force increase used drive gear meshing with force increase used change gear, the gear shift cam shaft is formed with a second slot having a track variation for driving a second gear shift drive fork which drives and shifts a second clutch to a force increase gear position where the second clutch meshes with and rotates the force increase used change gear which meshes with and rotates the force increase used drive gear, so that the power of the engine is transmitted through the reduction gear and the force increase used change gear of the gear shift shaft to the force increase used drive gear of the propeller shaft.

Further benefits and advantages of the present invention will become apparent after a careful reading of the detailed description with appropriate reference to the accompanying drawings.

DETAILED DESCRIPTION OF THE INVENTION

Figure 1:
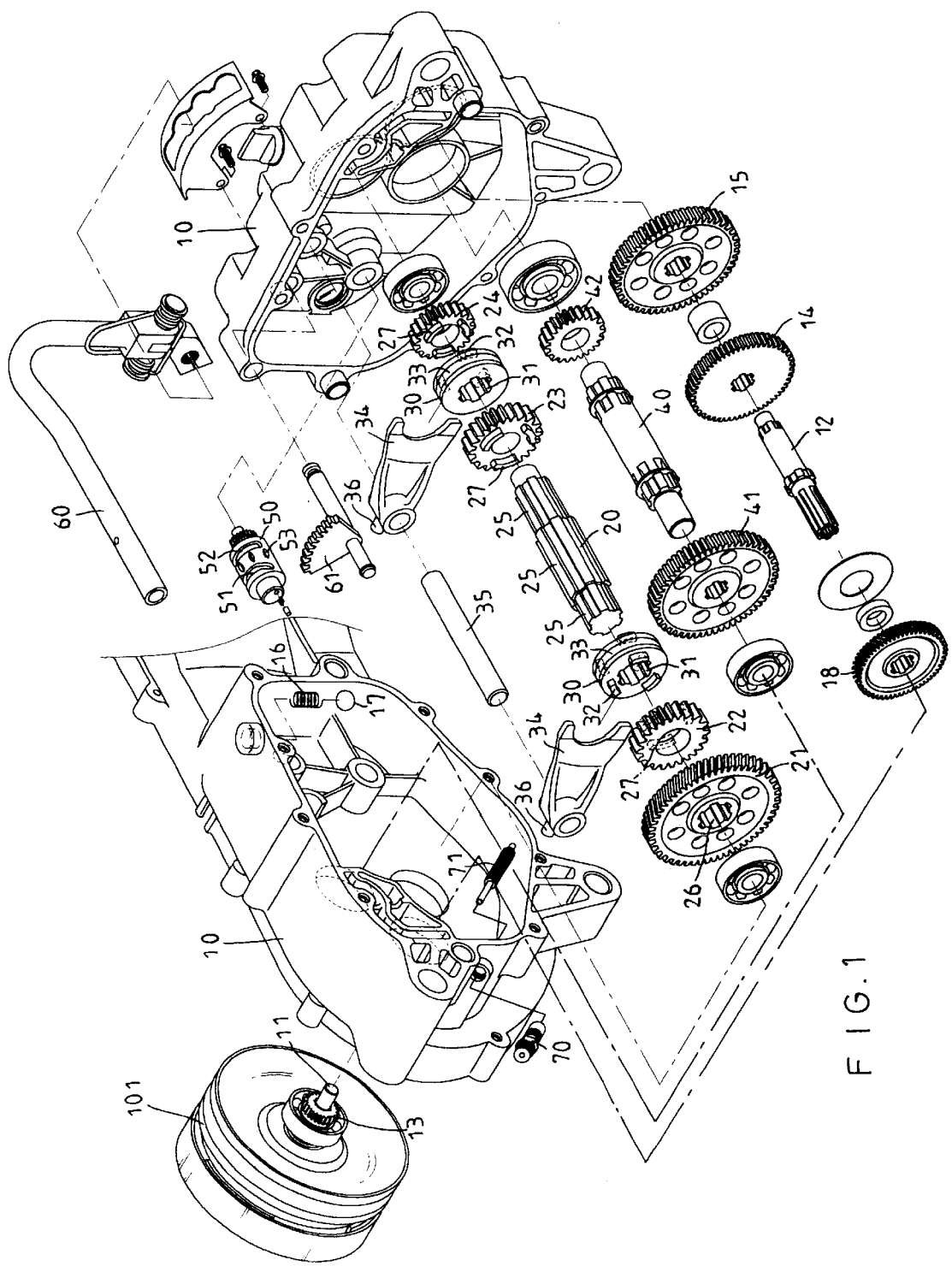
FIG. 1 is an exploded perspective view of a gearbox structure of a beach cycle in accordance with the present invention.
Figure 2:
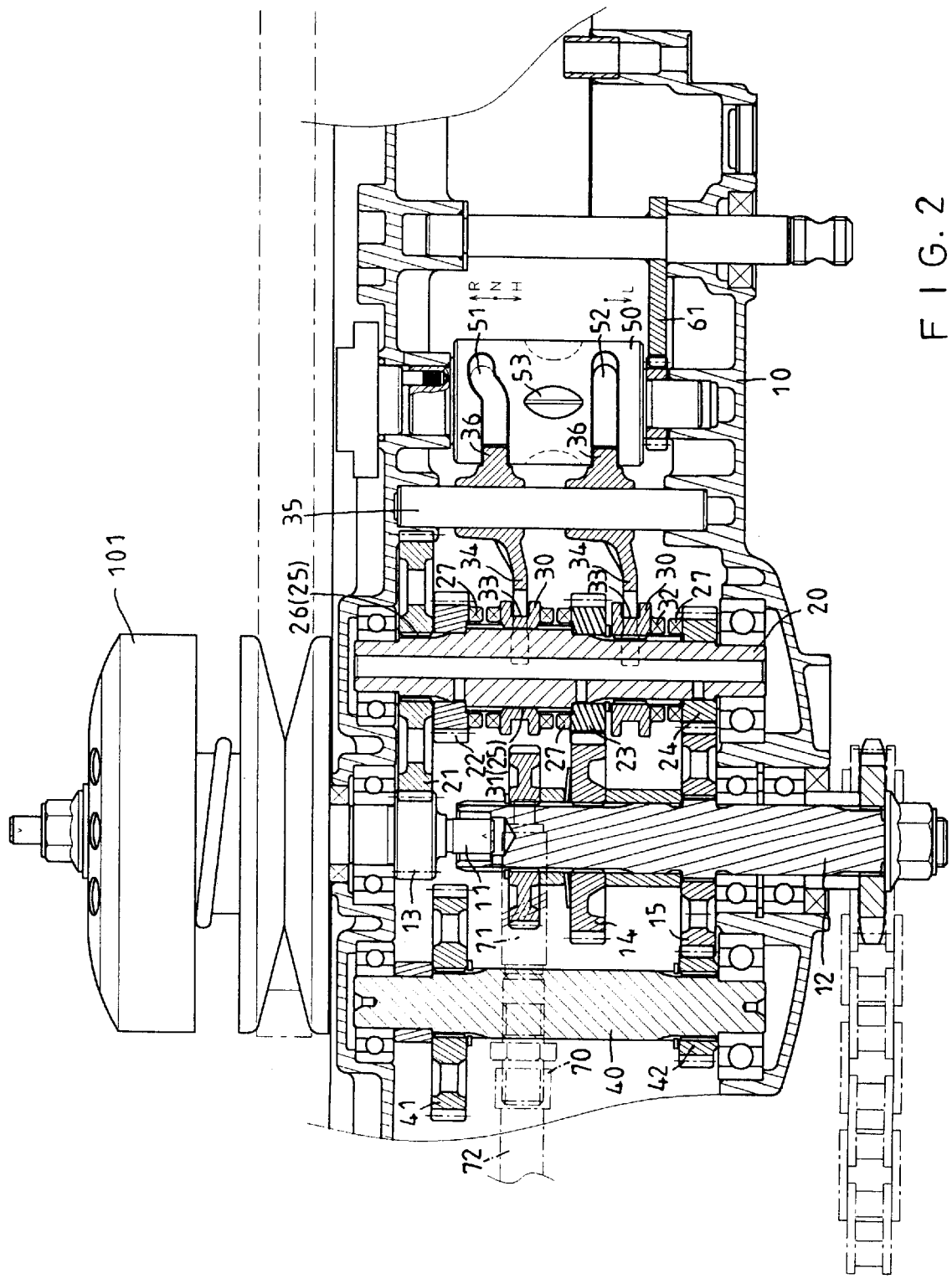
FIG. 2 is a cross-sectional assembly view of the gearbox structure of a beach cycle as shown in FIG. 1, wherein the gearbox structure is disposed at a neutral status.

Referring to the drawings and initially to FIGS. 1 and 2, a gearbox structure of a beach cycle in accordance with the present invention is shown, wherein FIG. 2 shows that the gearbox structure of a beach cycle in accordance with the present invention is disposed at a neutral status. The gearbox 10 transmits the power of the engine through the CVT gear shift 101 to the power shaft 11 which is fitted and combined with the propeller shaft 12, so that the power shaft 11 and the propeller shaft 12 may present a relative movement therebetween. The power shaft 11 includes a drive gear 13 meshing with the reduction gear 21 of a gear shift shaft 20 to drive and rotate the reduction gear 21. The gear shift shaft 20 is serially provided with a backward used change gear 22, a forward used change gear 23, and a force increase used change gear 24. The gear shift shaft 20 has an outer periphery formed with outer splines 25 between the backward used change gear 22, the forward used change gear 23, and the force increase used change gear 24, so that two sets of clutches 30 may be mounted between the backward used change gear 22, the forward used change gear 23, and the force increase used change gear 24. Each clutch 30 is formed with inner splines 31, and the reduction gear 21 is formed with inner splines 26. The clutches 30 are provided with locking blocks 32, while the backward used change gear 22, the forward used change gear 23, and the force increase used change gear 24 are also provided with locking blocks 27, so that the clutches 30 may be displaced on the outer splines 25 of the gear shift shaft 20 to selectively mesh with and drive one of the backward used change gear 22, the forward used change gear 23, and the force increase used change gear 24, thereby forming four different gear positions including the neutral status, the reverse gear status, the forward gear status, and the force increase gear status. The propeller shaft 12 is provided with a forward used drive gear 14, and a force increase used drive gear 15 to respectively mesh with the forward used change gear 23, and the force increase used change gear 24 of the gear shift shaft 20.

Figure 3:
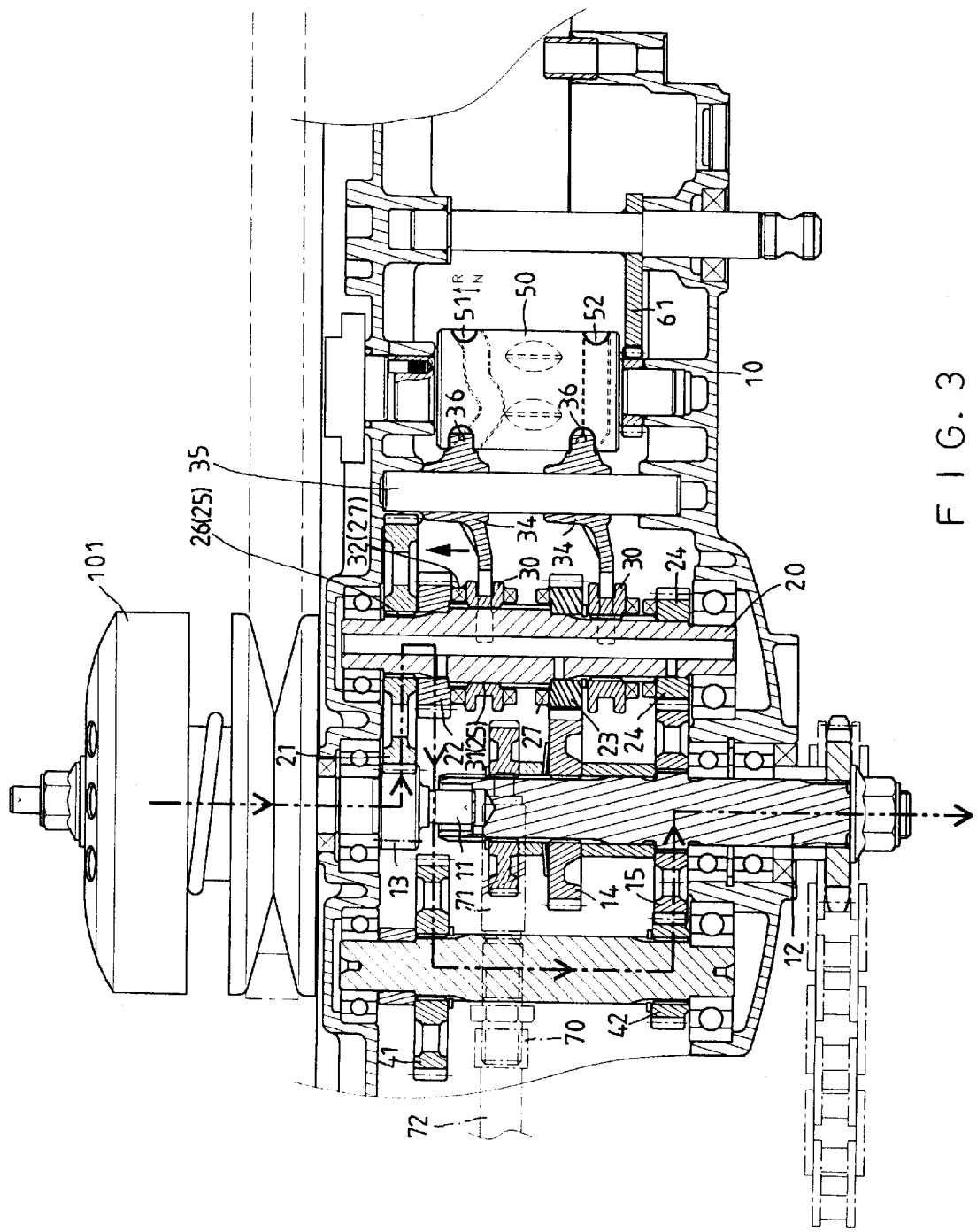
FIG. 3 is a cross-sectional assembly view of the gearbox structure of a beach cycle as shown in FIG. 1, wherein the gearbox structure is disposed at a reverse gear status.

FIG. 3 shows that the gearbox structure in accordance with the present invention is disposed at a reverse gear status. The backward used change gear 22 and the steering gear 41 of the steering shaft 40 mesh with each other, and another steering gear 42 of the steering shaft 40 and the force increase used drive gear 15 mesh with each other.

Figure 4:
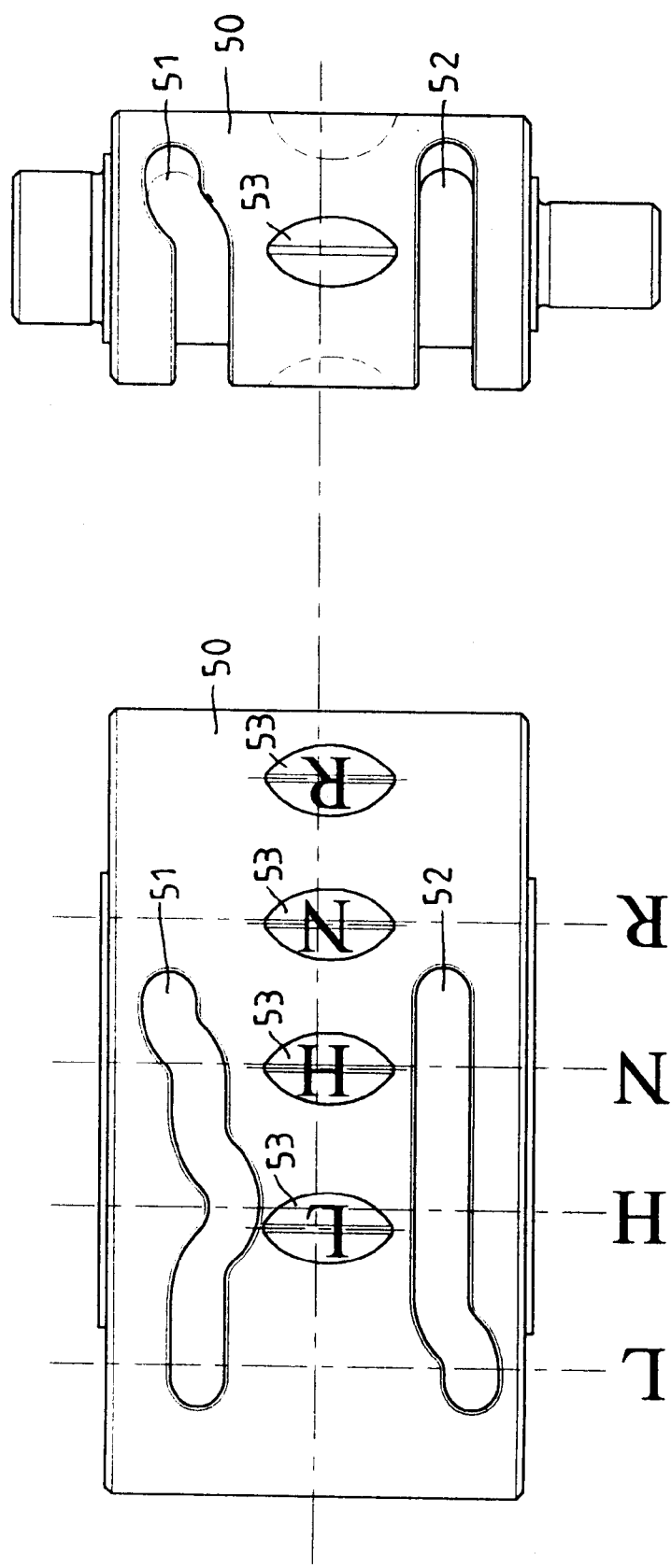
FIG. 4 is a schematic view of a gear shift cam shaft of the gearbox structure of a beach cycle in accordance with the present invention.

Each clutch 30 has an outer wall formed with an insertion groove 33 for receiving a first end of a gear shift drive fork 34 that is mounted on an axle 35. The second end of each of the two gear shift drive forks 34 is provided with a positioning post 36 which may slide with the track a respective one of two slots 51 and 52 formed in the periphery of a gear shift cam shaft 50. Referring to FIG. 4, the slot 51 is formed by a continuous track including a high stage, a middle stage, and a low stage, and the slot 52 is formed by a continuous track including a middle stage, and a low stage. The slots 51 and 52 respectively indicate different gear positions, including a reverse gear "R", a neutral status "N", a forward gear "H", and a force increase gear "L".

Figure 5:
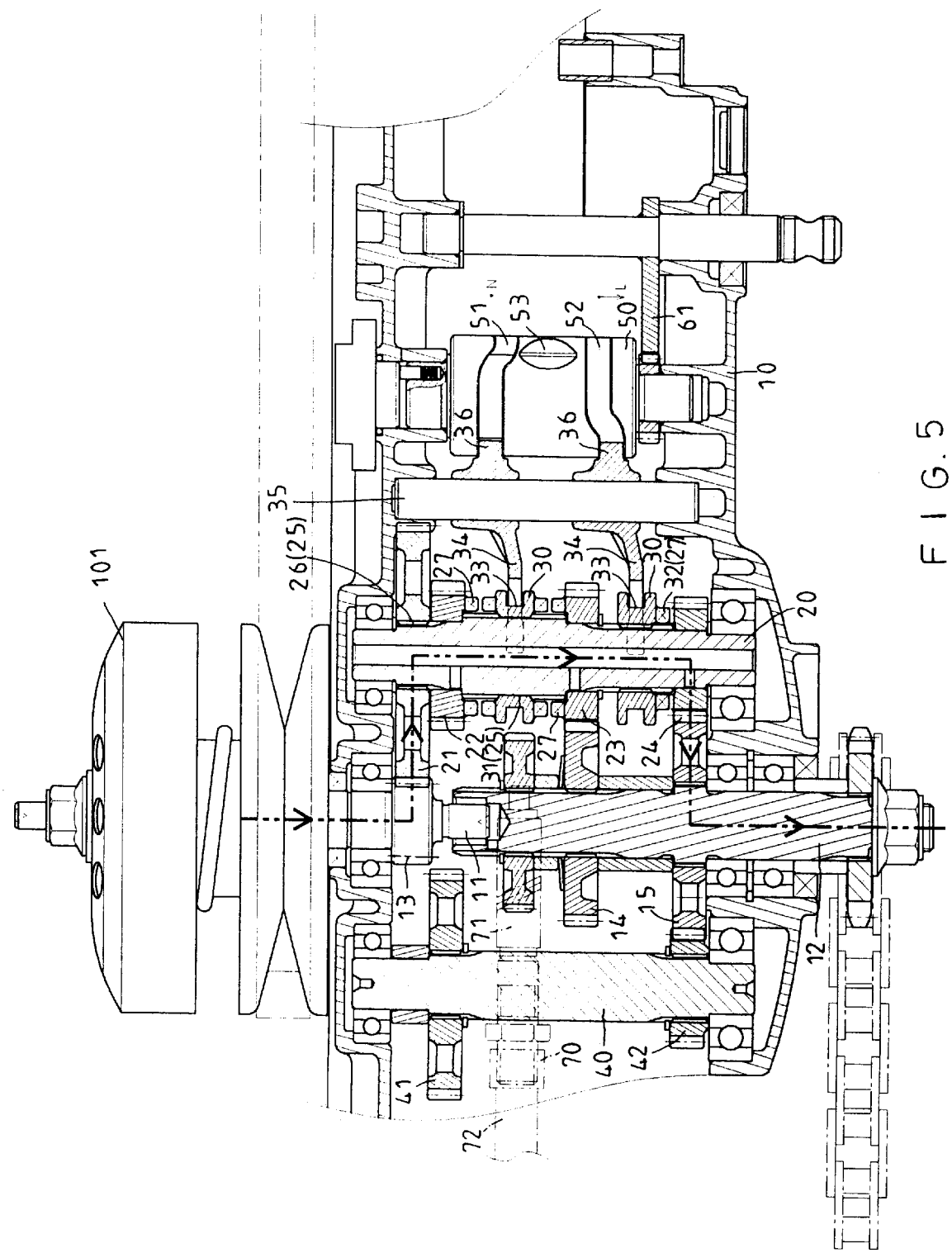
FIG. 5 is a cross-sectional assembly view, of the gearbox structure of a beach cycle as shown in FIG. 1, wherein the gearbox structure is disposed at a force increase gear status.

FIG. 5 shows that the gearbox structure in accordance with the present invention is disposed at a force increase gear status. When the beach cycle is deeply trapped and cannot move, the gearbox structure can be shifted to the force increase gear "L". Then, the locking blocks 32 of the clutch 30 and the locking blocks 27 of the force increase used change gear 24 are locked with each other to drive, so that the force increase used change gear 24 that has smaller teeth may drive the force increase used drive gear 15 that has larger teeth, thereby achieving a force increase effect with a low rotational speed and a large torsion, so that the beach cycle can detach from the trap conveniently.

Figure 6:
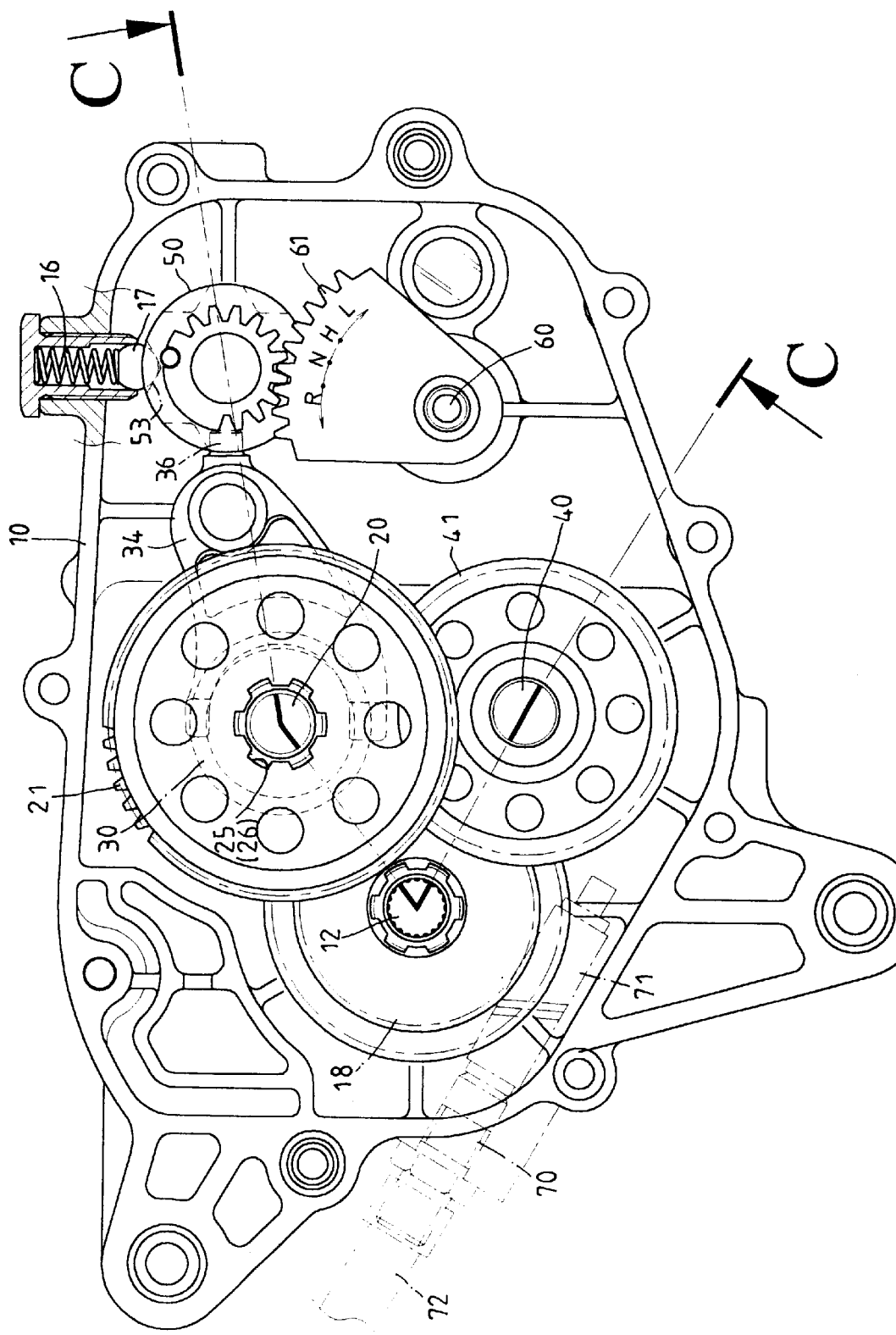
FIG. 6 is a plan assembly view of the gearbox structure of a beach cycle as shown in FIG. 1.

Referring to FIG. 6, for shifting and displacing the different gear positions accurately, the gearbox 10 is provided with a positioning spring 16, and a positioning ball 17. The gear shift can shaft 50 is formed with multiple positioning recesses 53 to mate with the respective gear position. When the gear lever 60 is pivoted to rotate a sector-shaped gear 61 that meshes with a gear mounted on the gear shift cam shaft 50, the gear shift cam shaft 50 is rotated to the correct gear position.

In addition, the propeller shaft 12 in the gearbox 10 is additionally provided with a drive gear 18 which meshes with the helical gear 71 of a distance calculator 70, and the connecting line 72 of the distance calculator 70 is externally connected to an odometer (not shown). In such a manner, the distance calculator 70 is mounted in the gearbox 10.

Although the invention has been explained in relation to its preferred embodiment as mentioned above, it is to be understood that many other possible modifications and variations can be made without departing from the scope of the present invention.

What is claimed is:

1. A gearbox structure of a beach cycle comprising:

a gearbox for transmitting a power of an engine through a CVT gear shift to a power shaft which is fitted with a propeller shaft, said power shaft and said propeller shaft directly meshing with each other through a reduction gear and change gears mounted on a gear shift shaft, and through steering gears mounted on a steering shaft, said change gears including a backward used change gear, and a forward used change gear, said propeller shaft provided with a forward used drive gear meshing with said forward used change gear, said gear shift shaft having an outer periphery formed with outer splines, a first clutch slidably mounted on said outer splines of said gear shift shaft, said first clutch formed with locking blocks engaged with locking blocks formed on said change gears, so that said first clutch can be shifted by a gear shift device into a neutral position, a reverse gear position and a forward gear position, said gear shift device including a gear lever which rotates a sector-shaped gear which meshes and rotates a gear shift cam shaft which is formed with a first slot having a track variation for driving a first gear shift drive fork which drives and shifts said first clutch to said neutral position, said reverse gear position, and said forward gear position, said gearbox provided with a positioning spring, and a positioning ball, said gear shift cam shaft formed with positioning recesses each mating with a respective gear position and each co-operating with said positioning spring, and said positioning ball, so that said gear shift cam shaft can be rotated to a correct gear position;

wherein, said gear shift shaft is provided with a force increase used change gear, said propeller shaft is provided with a force increase used drive gear meshing with said force increase used change gear, said gear shift cam shaft is formed with a second slot having a track variation for driving a second gear shift drive fork which drives and shifts a second clutch to a force increase gear position where said second clutch meshes with and rotates said force increase used change gear which meshes with and rotates said force increase used drive gear, so that said power of said engine is transmitted through said reduction gear and said force increase used change gear of said gear shift shaft to said force increase used drive gear of said propeller shaft.

2. The gearbox structure of a beach cycle in accordance with claim 1, wherein said propeller shaft in said gearbox is additionally provided with a drive gear which meshes with a helical gear of a distance calculator which has a connecting line externally connected to an odometer.

\* \* \* \* \*